Aug. 18, 1964  M. E. BOURNS ETAL  3,145,360
ELECTRIC PRESSURE-RESPONSIVE INSTRUMENT
Filed July 6, 1962  2 Sheets-Sheet 2

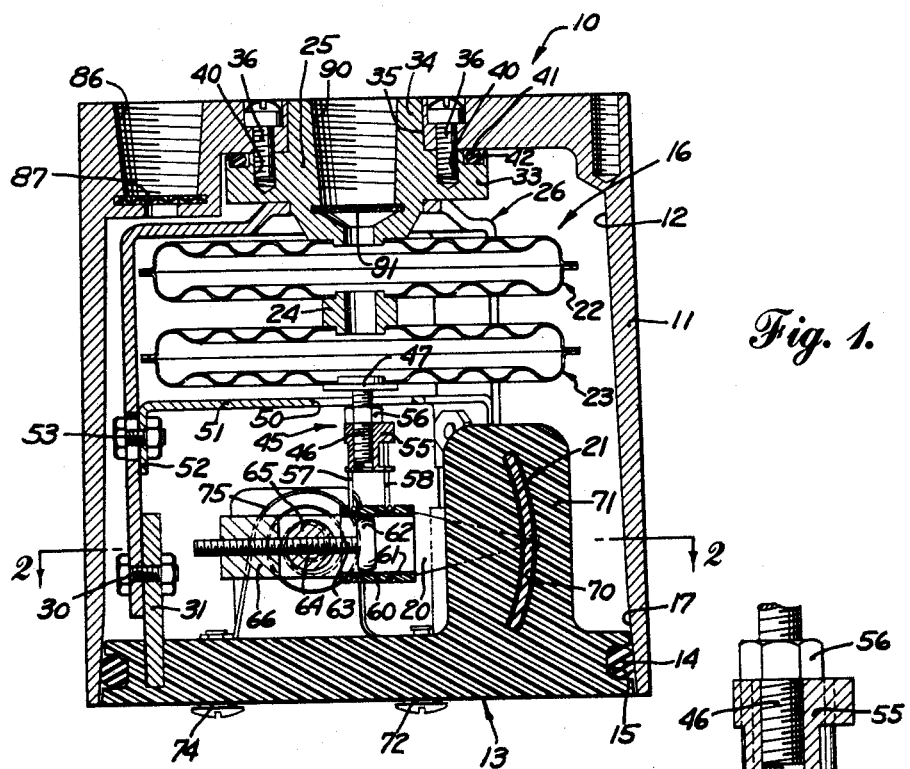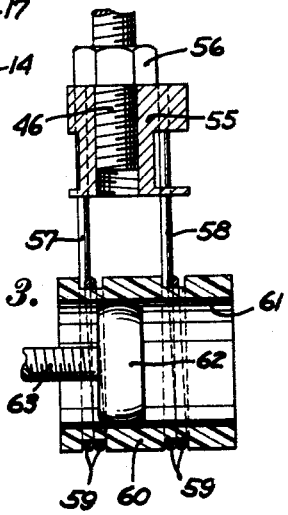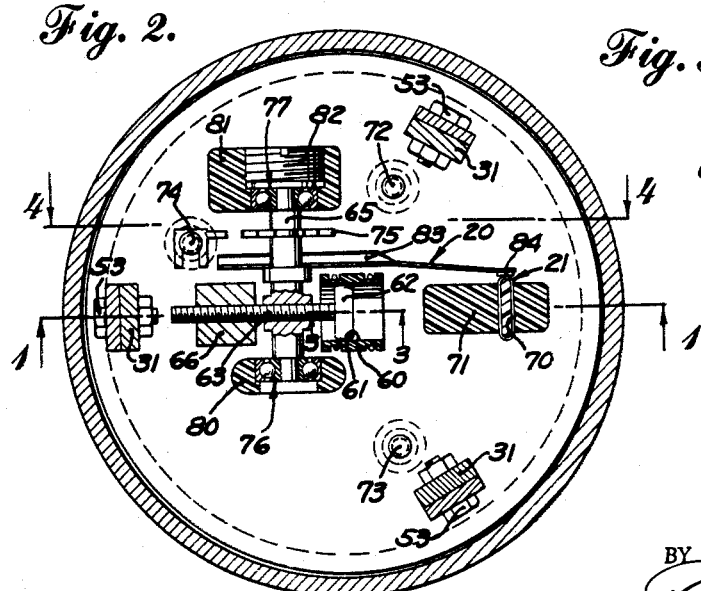

INVENTORS
MARLAN E. BOURNS
MARVIN E. HARRISON
BY

United States Patent Office 3,145,360
Patented Aug. 18, 1964

3,145,360
ELECTRIC PRESSURE-RESPONSIVE
INSTRUMENT
Marian E. Bourns and Marvin E. Harrison, both of Riverside, Calif., assignors to Bourns, Inc., a corporation
Filed July 6, 1962, Ser. No. 207,940
14 Claims. (Cl. 338—41)

The present invention relates to pressure-responsive instruments. This application is a continuation-in-part of our copending application entitled Pressure Responsive Instrument, Serial No. 733,153, filed May 5, 1958, now abandoned, and the latter application is a continuation of our application Serial No. 402,384, filed January 5, 1954 (now Patent No. 2,841,674), entitled Pressure Responsive Instrument, and with which it was copending.

The primary object of the invention is to provide a new and improved pressure responsive instrument of the type embodying a potentiometer or variable resistor, which is relatively simple and inexpensive to manufacture, easily adjusted, and extremely accurate in response.

One important object of the invention is to provide a novel connection between the pressure sensitive element and the contact member that wipes on a resistance element, whereby movement of the pressure sensitive element swings the contact member along the length of the resistance element. In one embodiment of the invention, a tube or barrel is connected to the pressure sensitive element, and disposed within the tube is a spherically curved disk that is mounted on an arm attached to the pivot shaft of the contact arm. This disk fits snugly within the tube, and is free to rock therein as the tube moves to and fro. In another embodiment, the tube is replaced by a slotted link which functions in the same manner as the tube; while a third embodiment uses a flat-surfaced magnet that holds the spherically curved disk against it by magnetic attraction.

Another object of the invention is to provide a new and unique arrangement whereby the contact arm and connecting linkage are balanced by means of a counterweight, thereby minimizing the effects of vibration or acceleration.

A further object of the invention is to provide a novel construction for a differential pressure unit, wherein fluid under one pressure is admitted to the interior of the housing, while fluid under another pressure is admitted to the interior of the bellows unit. In this case, the instrument measures the difference between the two pressures.

The foregoing and other objects and advantages of the present invention will become apparent to those skilled in the art upon consideration of the following detailed description of the preferred embodiment thereof, reference being had to the accompanying drawings, wherein:

FIGURE 1 is a vertical section, taken at 1—1 in FIGURE 2, through a pressure-responsive instrument embodying the principles of our invention;

FIGURE 2 is a transverse section through the same, taken at 2—2 in FIGURE 1;

FIGURE 3 is an enlarged fragmentary sectional view, taken at 3—3 in FIGURE 2;

Figure 4:
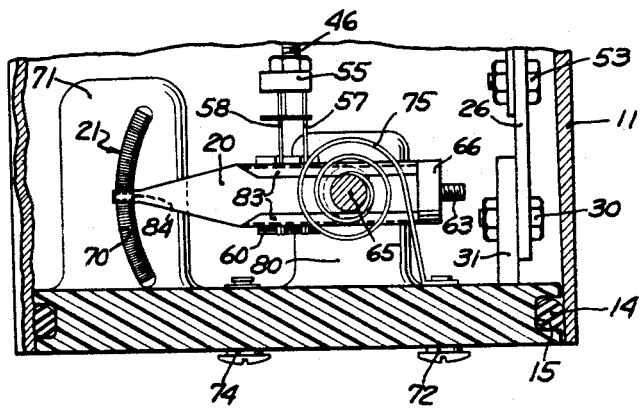
FIGURE 4 is a sectional view taken at 4—4 in FIGURE 2.

In the drawings, the instrument illustrating the principles of the invention is a pressure potentiometer, designated generally by the reference number 10, which comprises a cylindrical metal housing 11, having a cavity 12 extending inwardly from one end thereof. The open end of the housing 11 is closed by a lid 13 of nonconductive plastic material, such as one of the phenolic resins. The lid 13 is inserted into the end of the cavity 12, and the clearances between the lid and the housing are sealed by an O ring 14 which is seated within a circumferential groove 15 in the edge of the lid. The housing wall at the open end of the cavity is flared at 17 to facilitate insertion of the lid therein, and to permit drawing the lid into snug seating engagement with the housing.

Mounted within the cavity of the housing is a pressure-sensitive cell or element 16, which is operatively connected to a contact arm 20 that wipes on a resistance element 21. The pressure-sensitive element 16 may take forms other than that illustrated, but in the preferred form comprises an elastic cell including two bellows wafers 22 and 23, which are formed of corrugated sheet metal disks and joined together at their centers by a hollow bushing 24. The bellows unit 16 is attached at its top end by a fitting 25 to an inverted tripod support 26, the legs of which are secured by screws 30 to three equidistantly spaced lugs 31 embedded in and projecting upwardly from the plastic lid 13.

The fitting 25 connecting the bellows unit 16 to the tripod support 26 also has a radial flange 33, which bears against the inside surface of the end of the housing 11; and a hub portion 34, which projects through a hole 35 in the end of the housing. Screws 36 extend through holes in the end of the housing and are threaded into tapped holes 40 in the flange 33. An O ring 41 seated within a groove 42 in the flange 33, seals the clearances between the fitting 25 and the bottom of the housing.

The bottom end of the bellows unit 16 is free to move vertically in response to variations in the pressure differential between the inside and outside of the bellows unit, and is operatively connected to the contact arm 20 through the medium of a link member 45. The link 45 is in the form of a screw threaded stud 46, having a head 47 that is soldered to the bottom wall of the lower wafer 23. The stud 46 extends down through a hole 50 in a plate 51 having downwardly bent ears 52 that are secured by screws 53 to the legs of the tripod support 26. The function of the plate 51 is to limit extension of the bellows unit 16.

Screwed onto the bottom end of the stud 46 is a nut member 55, which is locked to the stud by a jam nut 56. As best shown in FIGURE 3, a pair of laterally spaced wires 57 and 58 are attached at their ends to the nut member 55 and extend downwardly therefrom; both of said wires having loops 59 formed at their bottom ends which loops encircle a plastic tube or barrel 60 and are seated in respective circumferential grooves therein. The barrel 60 is provided with a cylindrical bore 61, and is held by the wires 57, 58 with the bore 61 extending in a horizontal plane, perpendicular to a pivot shaft 65. Disposed within the bore 61, and touching lightly against the inner surface thereof around substantially its entire circumference, is a spherically rounded disk 62, which is rigidly attached to one end of a screw shaft 63 and forms the head thereof. The center of spherical curvature of disk 62 is at the longitudinal centerline of the screw shaft 63. The screw shaft 63 is threaded through a tapped hole 64 in the pivot shaft 65, and projects from the opposite side thereof. A counterweight 66 is threaded onto the projecting end of the screw opposite the disk 62.

The plastic barrel 60 has two functions: first, it insulates the bellows and link 45 from the contact arm 20; and second, it provides an adjustable moment arm through which the thrust of the bellows unit 16 is applied to the pivot shaft 65. Adjustment of the moment arm is obtained by turning the screw 63 one way or the other through the tapped hole in the pivot shaft 65, during which operation the disk 62 turns freely within the bore 61. The counterweight 66 is adjusted by screwing it one way or the other along the threaded shaft 63. Because of the spherical curvature of its peripheral edge, the disk 62 acts within the bore 61 like a ball within a cylinder, and full contact is maintained at all times between the barrel 60 and the disk for all positions of the barrel within the range of the instrument. This arrangement also permits axial adjustment of the disk 62 and screw 63 without in any way affecting the fit or clearance between the disk and the barrel.

The resistance element 21 is preferably in the form of a wirewound card, which is bent into an arc and inserted into a curved slot 70 formed in an upwardly projecting boss 71 that is molded integrally with the lid 13. The element 21 is cemented in place in the boss 71, and the ends of the wire winding are connected to terminals 72 and 73 (FIGURE 2), which are molded into the lid. A third terminal 74 is connected to the contact arm 20 by means of a torsion spring 75, which is attached to the pivot shaft 65. The pivot shaft 65 is pivotally supported between two ball bearings 76 and 77 that are mounted in laterally spaced, upwardly projecting bosses 80 and 81, which are molded integrally with the lid 13. Bearing 76 is pressed into place in a shouldered seat in boss 80, while bearing 77 is confined within boss 81 by a threaded plug 82 of larger diameter than the outer race of the bearing. This arrangement permits accurate location of the bearings 76 and 77 within the bosses 80, 81, and also facilitates assembling.

The contact arm 20 is rigidly attached to the pivot shaft 65 and is preferably formed of sheet metal, with bent up, converging edged portions 83, which stiffen the base portion of the arm against bending. The outer end of the contact arm is unreinforced, and is flexible to provide resilient pressure of the contact pellet 84 against the edge of the resistance element. The contact pellet 84 is soldered or otherwise rigidly fixed to the end of the arm 20.

The instrument illustrated in the drawings is intended for use as a differential pressure gage, and to that end is provided with a tapped hole 86 in the bottom of the housing 11 to receive a tube fitting, through which fluid under pressure from a first source is admitted to the interior of the housing. A screen 87 is secured within the tapped hole 86 to prevent the entrance of dirt or other foreign material. Fluid pressure from another source is introduced into the interior of the bellows unit 16 through a tapped hole 90.

Figure 5:
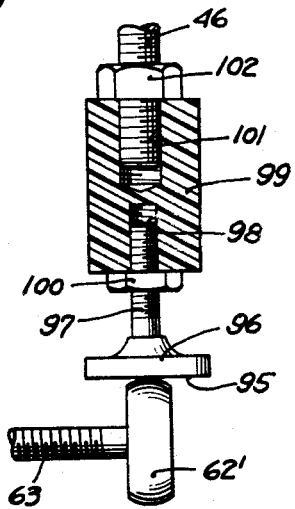
FIGURE 5 is an enlarged fragmentary view of another embodiment of the linkage arrangement shown in FIGURE 3.

Another form of linkage connecting the bellows unit 16 with the threaded shaft 63 is shown in FIGURE 5. In this case, the spherically rounded disk 62' on the end of the threaded shaft 63 is held by magnetic attraction against the flat bottom face 95 of a magnet 96. The magnet 96 is a permanent magnet, and disk 62' is made of ferromagnetic material. A threaded stem 97 projects upwardly from the magnet 96, and is screwed into a tapped hole 98 in a plastic insulator 99. A jam nut 100 locks the threaded shaft 97 in adjusted position. Extending down into the insulator 99 from the top end thereof is a tapped hole 101, into which the threaded stud 46 of the bellows unit 16 is screwed. A jam nut 102 locks the insulator 99 to the stud 46.

The principle of operation is substantially the same as in the preceding embodiment. The spherically rounded disk 62' is held by magnetic attraction against the flat face 95, and its spherical curvature permits a wide range of angular displacement between the shaft 63 and the magnet 96. The disk 62' can also turn freely with respect to the magnet, to permit adjustment of the effective length of the screw shaft 63. The principal difference between the two forms is that the disk 62' can be pulled away from the magnet 96 under excessive force, whereas no such separation is permitted in the embodiment of FIGURES 1 to 4.

Figure 6:
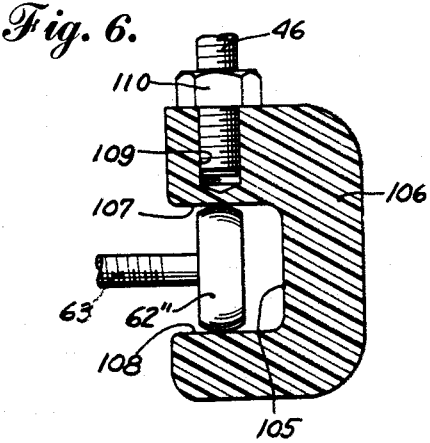
FIGURE 6 is a similar view of still another embodiment.

A third form of linkage connection between the bellows unit and the threaded shaft 63 is illustrated in FIGURE 6. In this case, the disk 62" is received within a notch 105 cut into one side of a plastic insulator 106. The disk 62" fits closely between the top and bottom surfaces 107, 108 of the notch 105, and functions in the same manner as a ball confined between two parallel plane surfaces. A tapped hole 109 in the top end of the plastic insulator 106 receives the threaded stud 46, and the insulator is locked to the stud by a jam nut 110. As in the preceding embodiments, the disk 62" is free to rock through a limited range without affecting the clearance between the disk and the surfaces 107, 108, and also turns freely with respect to the insulator 106, to permit adjustment of the screw shaft 63. The disk 62" is confined both top and bottom, and is not separable from the plastic insulator 106.

The operation and advantages of the invention are believed to be more or less self-evident from the illustrations and the foregoing description. When the instrument 10 is to be used as a differential pressure gage, fluid under pressure from one source is admitted to the interior of the housing through the tapped hole 86, while fluid under pressure from another source is admitted to the interior of the bellows unit through the tapped hole 90. In this case, the travel of the bellows unit depends upon the difference between the two pressures. Expansion or contraction of the bellows unit 16 causes the tube 60 to move downwardly or upwardly, as the case may be, and this rocks the screw shaft 63 and pivot shaft 65, causing the contact arm 20 to move downwardly or upwardly along the resistance element 21.

If it is desired to use the instrument as an absolute pressure gage, the interior of the housing would be exhausted to a high vacuum, and the tapped hole 86 would be plugged. Fluid under pressure would then be admitted to the interior of the bellows unit 16 through the tapped hole 90. Alternatively, the interior of the bellows unit 16 might be exhausted to a high vacuum and sealed. Fluid under pressure would then be admitted to the interior of the housing.

The advantages of the counterweight 66 will be obvious to those skilled in the art. The counterweight balances the mass of the contact arm 20, and the disk 62, and an appropriate portion of the mass of the bellows. By thus balancing the mass on opposite sides of the pivot shaft 65, the effect of vibration or acceleration on the contact arm and bellows unit assembly is minimized or eliminated altogether. The counterweight is readily adjusted to any position along the screw shaft 63 by merely turning it one way or the other. The screw shaft 63 is also adjustable through the pivot shaft 65 to lengthen or shorten the moment arm through which the force of the bellows unit is applied to the shaft 65. The linkage assembly shown in FIGURES 3, 5, and 6 accommodates this adjustment of the length of the moment arm, and also permits the disk 62 to rotate with respect to the barrel 60 or magnet 96, or plastic insulator 106.

While we have shown and described in considerable detail what we believe to be the preferred form of our invention, it will be understood that these embodiments are merely illustrative, and that various changes may be made in the shape and arrangement of the several parts without departing from the scope of the invention, as defined in the appended claims.

We claim:

1. A pressure-responsive instrument comprising: first means, including a pressure-sensitive cell expansible and contractible in response to changes in the difference between pressures exhibited by fluids inside and outside the cell, and said cell including a portion movable substantially rectilinearly in response to changes in said difference between pressures, said first means including supporting means;

second means, comprising a rotatable member disposed for rotation about an axis generally transverse of the line of motion of said rectilinearly-movable portion of said cell, and means supporting said member on said supporting means;

third means, comprising a headed member adjustably affixed to said rotatable member for adjustment along an axis generally transverse to the axis of rotation of said rotatable member and having a circular head having a spherical surface;

fourth means, comprising rectilinearly movable means affixed to said portion of said cell for rectilinear movements therewith, said rectilinearly movable means comprising means engaging said spherical surface for rotating said head through an adjustable angle about the axis of rotation of said rotatable member incident to any prescribed expansion and contraction of said cell; and fifth means, including a variable resistor comprising a contact member and a resistance element, one of the latter being affixed to said supporting means and the other to said rotatable member and positioned to wipe the other.

2. In a pressure-sensitive instrument: first means, comprising supporting means and a pressure-sensitive cell affixed to the supporting means and expansible and contractible in response to increases and decreases, respectively, of the relation to the pressure inside to the pressure outside the cell, said cell comprising a portion movable rectilinearly incident to such changes in the relation of said pressures;

second means, comprising a rotary member constrained to rotational movements about an axis of rotation and means mounting the rotary member on said supporting means;

third means, comprising an elongate headed member mounted on said rotary member generally transversely of the said axis of rotation and having means for adjusting the distance of the head of said member toward and away from said axis of rotation of the rotary member, the head of said elongate headed member having a spherical surface and movable in a plane parallel to the line of motion of said rectilinearly-movable portion of said cell and perpendicular to said axis of rotation;

fourth means, comprising means secured to and rectilinearly movable with said portion of said cell and engaging the head of said headed member and constraining the latter to movement therewith in said plane, whereby movements of said portion of said cell are translated into corresponding angular rotational movements of said rotary member; and fifth means, comprising a variable resistor connected to said rotary member and operated by rotational rocking movements of the latter.

3. A pressure-sensitive variable resistor comprising: first means, including supporting means, and supported thereon a bellows unit having a rectilinearly movable end, and a pivot shaft; second means, including a threaded shaft transversely threaded through said pivot shaft to permit adjustment of the effective length of said threaded shaft, and a head on the end of said threaded shaft and rotatable therewith, said head having a spherically rounded peripheral surface; third means, including a nonconductive plastic tubular member attached to said movable end of said bellows unit and extending generally longitudinally of said threaded shaft, said head being disposed within said tubular member and with said spherically rounded peripheral surface contacting the inner surface thereof, the axis of said tubular member moving in the plane containing the axis of said threaded shaft, whereby rectilinear movements of said end are accurately converted into rotary movements of said shaft; and fourth means, comprising a variable resistor having a contact and a resistance element, a first one of latter being affixed on said supporting means and the second thereof being supported on said pivot shaft and disposed to brush the first thereof.

4. A pressure-sensitive instrument comprising: supporting means, a pressure-sensitive cell affixed to said supporting means and having a rectilinearly movable part, a rotatable member mounted on said supporting means and rotatable about an axis not intersecting the line of movement of the rectilinearly movable part, a potentiometer including a contact carried by said rotatable member, and a device for accurately converting linear movements of the rectilinearly movable part to rotary movement of the rotary member for operating said contact member, said device comprising:

first means, comprising a first component, secured to the rectilinearly movable part of said pressure-sensitive cell for rectilinear movement therewith, said first component having a substantially smooth surface extending at right angles to said line of movement and disposed in a substantially fixed angular attitude relative to said line of movement;

second means, including a second component having a head presenting at least a section of a spherical surface in contact with said substantially smooth surface, arranged for movement by the first component incident to rectilinear movement of said first component in at least one direction, said second means being secured to said rotatable member to rotate the latter incident to movement of said second component by said first component, said second means including provisions for causing said second component to remain in contact with said surface of said first component, whereby rectilinear movements of said rectilinearly movable part are accurately converted to corresponding rotary movements of said rotatable member and said contact without lost motion.

5. Means as defined by claim 4, said first component comprising a first device having a generally cylindrical surface and disposed with the axis of said cylindrical surface perpendicular to said line of motion, and said second component comprising a screw device having a head disposed in said first device and said head having a peripheral surface formed as a section of a sphere and the latter surface being disposed in substantially peripheral contact with said cylindrical surface of said first device.

6. Means as defined by claim 4, in which said first component comprises opposed smooth surfaces engaging opposite portions of said head of said second component.

7. Means as defined by claim 4, in which the provisions for causing said second component to remain in contact with said surface of said first component comprise means which coerces said second component to remain in contact with said surface of said first component.

8. Means as defined by claim 4, in which the provisions for causing said second component to remain in contact with said surface of said first component comprise a second surface area provided on said first component, which second surface area bears against said section of a spherical surface presented by said second component.

9. A pressure-responsive instrument, comprising:

first means, comprising an elastic cell means susceptible of volumetric change incident to expansion and contraction thereof and having inner and outer surfaces sealed one from the other to expose said surfaces to respectively different fluids whereby said cell means expands and contracts in response to changes in the difference between the pressures exhibited by such fluids, said cell means being disposed and arranged for rectilinear motion of a portion thereof incident to volumetric change of the cell means;

second means, including supporting and housing means providing a substantially enclosed chamber by which said first means is enclosed and supported;

third means, comprising a variable resistance element and a movable wiper contact therefor, in said chamber and said element supported therein by said second means;

fourth means in said chamber, comprising a rockable lever means and pivot means therefor supported by said first means and defining and providing an axis of rotation for the lever means, said fourth means comprising a member secured to said portion of said cell means for rectilinear movement therewith along a rectilinear path in response to corresponding motion of said portion of said cell means, and means connecting said member and said lever means for rocking the lever means incident to rectilinear movement of the member, said fourth means further comprising means affixing said wiper contact to said lever means for movement thereby, and means electrically insulating said lever means from said cell means;

and means forming provisions for subjecting said surfaces of said cell means to fluids exhibiting respectively different pressures.

10. A pressure-responsive instrument according to claim 9, in which said pivot means comprises anti-friction pivot means.

11. A pressure-responsive instrument according to claim 9, in which said means electrically insulating said lever means from said cell means comprises an insulative cylinder connected to move along said path and engaging and arcuately moving a complementary portion of said lever means.

12. A pressure-responsive instrument according to claim 9, in which said wiper contact and said lever means are electrically interconnected and said lever means is insulated from said cell means by insulation interposed between said lever means and said cell means.

13. A pressure-responsive instrument as defined in claim 9, in which said lever means comprises an arm of adjustable effective length and a head on said arm, and in which said fourth means comprises a cylinder with its axis disposed transversely of said path and arranged to encircle and closely engage said head to move the latter, whereby adjustment of the effective length of said arm changes the ratio of the extent of linear movement of said portion of said cell means to the extent of corresponding rocking motion of said lever means.

14. A pressure-responsive instrument as defined by claim 9, in which said connecting means of said fourth means comprises linearly movable means providing a substantially smooth surface extending at right angles to the line of motion of said portion of said elastic cell means and disposed in a substantially fixed attitude relative to said line of motion, and in which said lever means comprises a component having a head presenting at least a section of a spherical surface in contact with said substantially smooth surface and arranged for rocking movement by said smooth surface incident to rectilinear movement of said member and further comprising in said rectilinearly movable means and said lever means a means for maintaining said section of a spherical surface in contact with said substantially smooth surface, whereby lost-motion effects between said section of a spherical surface and said substantially smooth surface are substantially eliminated.

References Cited in the file of this patent
UNITED STATES PATENTS

| | | |
|---|---|---|
| 2,759,367 | Doutt | Aug. 21, 1956 |
| 2,951,225 | Hentzi | Aug. 30, 1960 |
| 3,013,236 | Bourns | Dec. 12, 1961 |
| 3,030,816 | Thomsen | Apr. 24, 1962 |